United States Patent [19]

Dammann et al.

[11] Patent Number: 5,417,817
[45] Date of Patent: May 23, 1995

[54] BIOMASS GASIFICATION PROCESS AND APPARATUS

[76] Inventors: Wilbur A. Dammann, 1115 Carriage Rd., Papillion, Nebr. 68046; W. David Wallman, 1350 Northface Ct., Colorado Springs, Colo. 80919

[21] Appl. No.: 259,878

[22] Filed: Jun. 15, 1994

[51] Int. Cl.[6] .............................................. F02B 43/08
[52] U.S. Cl. ................................. 204/129; 204/164; 204/168; 204/170; 204/173; 204/228; 204/242; 123/3
[58] Field of Search .............. 204/164, 170, 173, 168, 204/129, 228, 242; 123/3

[56] References Cited

U.S. PATENT DOCUMENTS

| | | | |
|---|---|---|---|
| Re. 28,547 | 9/1975 | Pacheco | 123/3 |
| 603,058 | 4/1898 | Eldridge et al. | 204/164 |
| 887,989 | 5/1908 | Weber | 123/3 |
| 1,327,495 | 1/1920 | Smith | 123/4 |
| 1,529,764 | 3/1925 | Bamber | 123/3 |
| 1,716,084 | 6/1929 | Percy | 123/3 |
| 1,795,670 | 3/1931 | Odell et al. | 123/3 |
| 4,141,694 | 2/1979 | Camacho | 48/61 |
| 4,181,504 | 1/1980 | Camacho | 48/197 R |
| 4,279,710 | 7/1981 | Coughlin | 204/101 |
| 4,333,423 | 6/1982 | Firey | 123/23 |
| 4,361,474 | 11/1982 | Shoaf et al. | 204/239 |
| 4,472,172 | 9/1984 | Sheer et al. | 48/202 |
| 4,487,683 | 12/1984 | Bozzuto | 208/8 |
| 4,566,961 | 1/1986 | Diaz et al. | 204/168 |
| 4,588,850 | 5/1986 | Mueller et al. | 585/539 |
| 4,690,743 | 9/1987 | Ethington et al. | 204/168 |
| 5,159,900 | 11/1992 | Dammann | 123/3 |

FOREIGN PATENT DOCUMENTS

| | | |
|---|---|---|
| 307529 | 8/1928 | United Kingdom . |
| 765517 | 9/1980 | U.S.S.R. . |
| 1467234 | 3/1989 | U.S.S.R. . |

OTHER PUBLICATIONS

Okada et al., "On the Electrolysis of Coal Slurries", Journal of the Electrochemical Soc., vol. 128, No. 10, Oct. 1981, pp. 2097-2102.
Coughlin et al., "Hydrogen Production From Coal, Water and Electrons", Nature vol. 279, May 1979, pp. 301-303.

Primary Examiner—Kathryn Gorgos
Assistant Examiner—Arun S. Phasge
Attorney, Agent, or Firm—Zarley, McKee, Thomte, Voorhees & Sease; Mark D. Frederiksen

[57] ABSTRACT

An apparatus for a gasification of a biomass liquid solution includes a reaction chamber having a biomass liquid solution therein. The biomass solution includes at least water and carbon. A pair of spaced apart carbon electrodes are immersed in the solution within the chamber. A direct current electrical supply is connected to the electrodes to form an electrical arc passing from one electrode to the other and thereby oxidizing carbon of one electrode. The oxidized carbon forms a carbon monoxide and hydrogen gas mixture, and carbon released from the biomass solution during oxidation is deposited on the opposite electrode. A switch is interposed between the source of electric power and the electrodes so as to selectively switch the polarity of the electric arc to thereby cause oxidation of the opposite electrode and the deposit of carbon on the previously oxidized electrode while continuing to manufacture $COH_2$ gas. A sensor detects the position of the electric arc, and thereby detects the length of the oxidizing electrode, and is electrically connected to a control unit which will cause the switch to change polarity of the electrodes when the oxidizing electrode reaches a predetermined length. The biomass solution may be formed from a mixture of water with starches, sugars, carbohydrates, alcohols, and the like.

13 Claims, 2 Drawing Sheets

BIOMASS GASIFICATION PROCESS AND APPARATUS

TECHNICAL FIELD

The present invention relates generally to a method and means for the generation of gas for use as a fuel for internal combustion engines, and more specifically to a process for the gasification of a biomass feedstock for use as a chemical raw material and as a fuel.

BACKGROUND OF THE INVENTION

In U.S. Pat. No. 5,159,900, one of the inventors herein disclose a rapid oxidation process to produce a gas for use as a fuel from water and carbon. This gas product is created by the decomposition of water through oxidation. Hydrogen is displaced when a substance is oxidized in water. Rapid oxidation can be forced by using an electrical arc to burn a substance within a biomass feedstock solution, thereby oxidizing the substance by an electro-thermochemical reaction. The result is the rapid formation of a mixture of hydrogen and carbon monoxide gas ($COH_2$).

The $COH_2$ mixture is a gas which will burn very clean in oxygen or air, and therefore is desirable for use as a fuel in an internal combustion engine. When burned, $COH_2$ produces carbon dioxide and water vapor, thereby adding very little, if any, pollution to the environment.

As discussed in U.S. Pat. No. 5,159,900, a problem arises in the storage of $COH_2$ gas, and therefore it is desirable to produce $COH_2$ gas on an on-demand basis. U.S. Pat. No. 5,159,900 to Wilbur Dammann discloses the use of an electrical arc between two carbon electrodes submersed in water to produce the reaction necessary to rapidly oxidize carbon and produce $COH_2$ gas. Because the carbon electrodes were consumed during the reaction, there was no residue. Rather, the total of the water and carbon was changed to an oxygenated combustible gas. This process can be represented by the following equation: $C + H_2O \rightarrow CO + H_2$.

Thus, carbon and water are consumed during the reaction, without the production of residue. While water can be easily added within the reaction chamber without disrupting the reaction, the carbon electrodes cannot be replaced in the reaction chamber without disrupting the reaction.

SUMMARY OF THE INVENTION

It is therefore a general object of the present invention to provide a method for producing on-demand generation of gas from water and carbon for uses of fuel for internal combustion engines.

Another object is to provide a biomass gasification process and apparatus which continuously replenishes the carbon electrodes from a biomass feed stock, to avoid the need for replacing the electrodes.

Another object is to provide a method and apparatus for producing $COH_2$ gas from common biomass feed stock.

These and other objects will be apparent to those skilled in the art.

An apparatus for a gasification of a biomass liquid solution includes a reaction chamber having a biomass liquid solution therein. The biomass solution includes at least water and carbon. A pair of spaced apart carbon electrodes are immersed in the solution within the chamber. A direct current electrical supply is connected to the electrodes to form an electrical arc passing from one electrode to the other and thereby oxidizing carbon of one electrode. The oxidized carbon forms a carbon monoxide and hydrogen gas mixture, and carbon released from the biomass solution during oxidation is deposited on the opposite electrode. A switch is interposed between the source of electric power and the electrodes so as to selectively switch the polarity of the electric arc to thereby cause oxidation of the opposite electrode and the deposit of carbon on the previously oxidized electrode while continuing to manufacture $COH_2$ gas. A sensor detects the position of the electric arc, and thereby detects the length of the oxidizing electrode, and is electrically connected to a control unit which will cause the switch to change polarity of the electrodes when the oxidizing electrode reaches a predetermined length. The biomass solution may be formed from a mixture of water with starches, sugars, carbohydrates, alcohols, and the like.

DESCRIPTION OF THE PREFERRED EMBODIMENT

Figure 1:
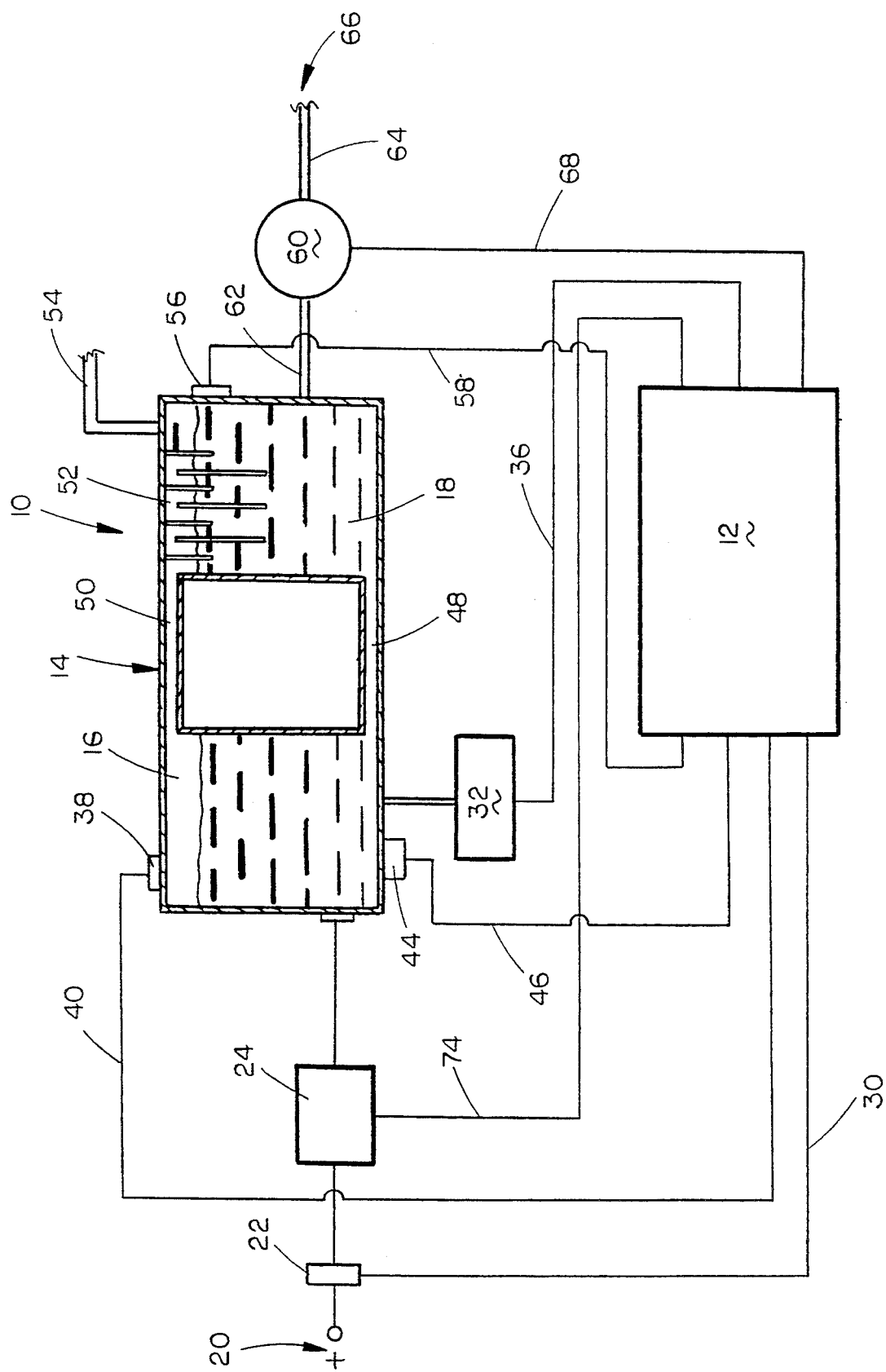
FIG. 1 is a schematic diagram of the gas generation unit of the present invention.

Referring now to the drawings, in which similar or corresponding parts are identified with the same reference numeral, and more particularly to FIG. 1, the apparatus for generating gas from water and carbon is designated generally at 10, and includes an electronic control unit 12 connected to a housing 14 which includes a reaction chamber 16 separated from a feedstock chamber 18.

Figure 2:
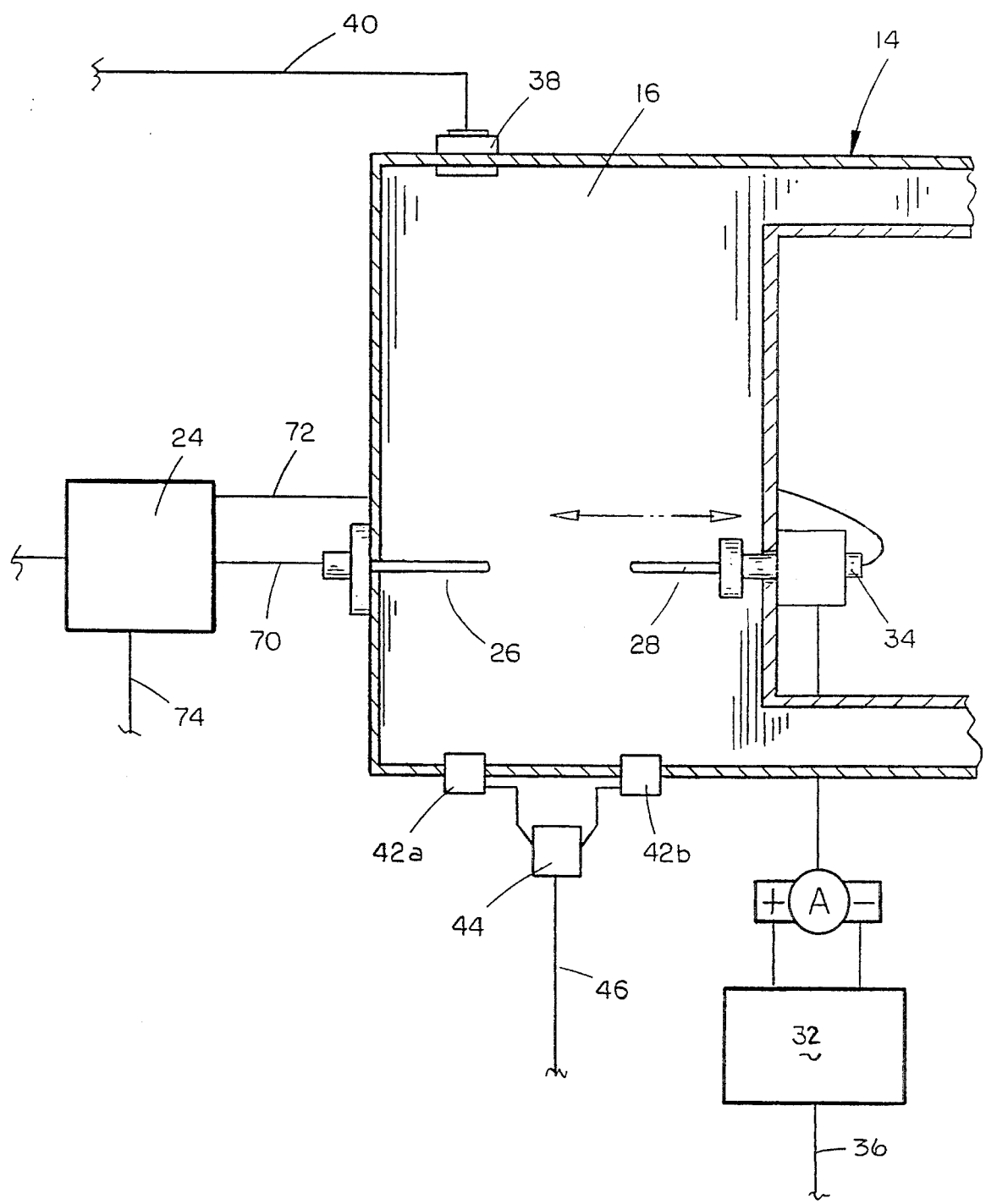
FIG. 2 is a schematic diagram showing a sectional view of the gas reaction chamber and the associated switching mechanism.

A source of electrical power, such as a battery 20 is electrically connected through a power sensor 22 and a switch 24 to electrodes 26 and 28 (shown in FIG. 2). Power sensor 22 senses the voltage across the electrodes 26 and 28, and also senses the current flowing therethrough. This information is fed to control unit 12 via a conductor 30, which in turn controls the operation of a servo drive 32, as described in more detail hereinbelow.

Referring now to FIG. 2, electrode 26 is fixed in position in one side wall of reaction chamber 16, and extends inwardly into the reaction chamber. The second electrode 28 is mounted on a servo shaft 34 which is operable to slide inwardly and outwardly from chamber 16 by the servo drive 32, to vary the distance between electrodes 26 and 28. Servo drive 32 is electrically connected to control unit 12 via conductor 36, which controls the operation and direction of servo drive 32.

Reaction chamber 16 includes a pressure sensor 38 which is connected to control unit 12 by lead 40. A pair of position sensors 42a and 42b are mounted in reaction chamber 16 adjacent electrodes 26 and 28 respectively. Position sensors 42a and 42b are linked to compare the radiated energy of the electric arc extending between electrodes 26 and 28 at different locations, to determine the position of the arc within reaction chamber 16, and thereby determine the location of the ends of electrodes 26 and 28. Position sensors 42a and 42b are connected at a junction 44 and electrically connected to control unit 12 via conductor 46. As shown in FIG. 1, a lower passageway 48 extends between feedstock chamber 18 and reaction chamber 16, at the lower end of housing 14. An upper passageway 50 connects the upper ends of reaction chamber 16 and feedstock chamber 18. Upper passageway 50 extends directly from reaction 16 into a gas/water separator 52 located in the upper end of feedstock chamber 18. A gas line 54 is in communication with the gas/water separator and extends to a storage chamber or an internal combustion engine, to supply $COH_2$ gas to a predetermined location.

A water level sensor 56 is provided in feedstock chamber 18 and is electrically connected to control unit 12 via lead 58. A pump 60 is connected to feedstock chamber 18 by waterline 62, and has a waterline 64 extending to a source of water, referred to generally by the reference numeral 66. Pump 60 is controlled by control unit 12 through lead 68.

Referring now to FIG. 2, switch 24 includes one conductor 70 connected to electrode 26, and a conductor 72 electrically connected to electrode 28. Switch 24 is utilized to switch the polarity of direct current (DC) electrical energy flowing through conductors 70 and 72 to electrodes 26 and 28. A lead 74 connects polarity switch 24 to control unit 12, which determines the timing for the switching of polarity.

In operation, power is supplied to control unit 12, the servo drive 32, pump 60 and electrodes 26 and 28. Control unit 12 checks all sensor inputs, such as power sensor 22, pressure sensor 38, position sensor 42 and water level sensor 56. Control unit 12 will continuously check these sensor signals and immediately initiate any necessary response required by the signals. For example, if the pressure within reaction chamber 16 is below a predetermined range, control unit 12 will initiate the servo drive 32 to move electrode 28 towards electrode 26 until the electrodes are at optimum spacing for most efficient operation, by monitoring the feedback signal from power sensor 22.

In U.S. Pat. No. 5,159,900, carbon electrodes were utilized to supply the carbon which was oxidized under water. As noted above, this required the replacement of the carbon electrodes in order to continue the reaction process. In the present invention, a carbon rich feedstock solution is utilized, such that the reactive carbon is continuously replenished within the reaction chamber. A source of feedstock, formed of a solution of water and carbon, is supplied through pump 60 to feedstock chamber 18. As the feedstock solution is rapidly oxidized in reaction chamber 16, the level of liquid within feedstock chamber 18 will also drop. This drop in liquid level is sensed by liquid level sensor 56, which is in turn transmitted to control unit 12. Control unit 12 will then supply an appropriate quantity of additional feedstock, via pump 60, to feedstock chamber 18.

While the inventors have experimented with the described process using a biomass feedstock solution of water and glucose ($C_6H_{12}O_6$), and water and sucrose ($C_{12}H_{22}O_{11}$), it is believed that any carbon rich solution would work well. Thus, carbon-based liquids and solutions including carbohydrates and alcohols would provide the necessary components for the feedstock. Carbohydrates such as cellulose, starches, sugars and glycogens are readily available for such use.

Many sources of biomass feedstock solutions can be used with the biomass gasification process. Plant materials such as cornstalks, wheat straw, wood, grasses, leaves, sawdust, and common "yard waste", may be converted into a feedstock solution. In addition, other organic substances, such as lignocellulosic materials (including agricultural waste such as manure, municipal solid waste, and residue from logging operations) may be effectively utilized.

During operation, rapid oxidation of carbon in water results in hydrogen molecules being displaced by carbon, which produces carbon monoxide and hydrogen gas. The carbon on electrodes 26 and 28 will be continuously replenished when utilizing a solution rich in carbon, hydrogen and oxygen. The inventors have utilized a solution of $H_2O + C_{12}H_{22}O_{11}$ during testing, and have found that carbon is deposited on the negative electrode as carbon is oxidized from the positive electrode during the reaction.

When utilizing alternating current, the inventors have found that oxidation of both carbon electrodes is equal and are consumed rapidly. The biomass feedstock solution of $H_2O + C_{12}H_{22}O_{11}$ turns dark from the suspended carbon that is released from the solution by the rapid oxidation reaction.

On the other hand, when utilizing direct current, the carbon from the solution is electroplated onto the cathode electrode as it is oxidized from the anode electrode. With proper voltage and current, the rate of electroplating is equal to the rate of oxidation. The solution remains clear and the cathode electrode increases length at the same rate that the anode electrode decreases in length.

Position sensors 42 are provided to transmit information as to position of the electrical arc extending between the electrodes, to thereby calculate the relative lengths of the electrodes. This information is fed to the control unit 12, so as to reverse the polarity of the current at predetermined positions. The polarity of the current is periodically changed during the reaction, so as to cause oxidation on the electrode which previously had been receiving carbon deposits, while electroplating the electrode which had been oxidizing carbon therefrom.

As discussed in more detail in U.S. Pat. No. 5,159,900 control unit 12 causes electrical energy to be supplied to electrodes 26 and 28, such that an electrical arc passes therebetween with the temperature of the arc perhaps exceeding 6,000° F. The heat and difference of potential between the carbon electrodes ionizes and vaporizes the carbon in an exothermic reaction. Electrons pass through the vaporized carbon, causing the carbon vapor to oxidize or burn. The displacement of oxygen in the water by forced rapid oxidation, an endothermic reaction, releases carbon monoxide and hydrogen gas.

Whereas the invention has been shown and described in connection with the preferred embodiment thereof, it should be understood that many modifications, substitutions and additions may be made which are within the intended broad scope of the appended claims.

We claim:

1. Apparatus for the gasification of a biomass liquid solution, comprising:
   a reaction chamber at least partially filled with a biomass solution of at least water and carbon;
   a pair of spaced apart carbon electrodes in said reaction chamber immersed in the biomass solution;
   means for creating an electric arc between said electrodes by supplying a direct electrical current to said electrodes; and
   switch means interposed between a source of electrical current and said electrodes for selectively switching polarity of the current supplied to the electrode.

2. The apparatus of claim 1, further comprising means for varying the distance between said electrodes.

3. The apparatus of claim 2, further comprising a control unit for selectively activating the means for varying the distance between the electrodes.

4. The apparatus of claim 1, further comprising a control unit for selectively activating the switch means to switch polarity.

5. The apparatus of claim 4, further comprising means for sensing the position of an electric arc within said reaction chamber.

6. The apparatus of claim 5, wherein said control unit includes means responsive to the position sensing means, to activate said switch means in response to set positions of an electric arc.

7. The apparatus of claim 1, further comprising means for sensing the position of an electric arc within said reaction chamber.

8. A method for the gasification of a biomass liquid solution, comprising the steps of:

supplying a reaction chamber with a quantity of a biomass liquid solution formed of at least water and carbon;

creating a direct current electrical arc within the solution extending from a first carbon electrode to a second carbon electrode to cause rapid oxidation of carbon from the first electrode and to form carbon monoxide and hydrogen and to release carbon from the biomass solution and deposit the released carbon on the second electrode;

sensing the lengths of the first and second electrodes; and changing polarity of the electric arc when the first electrode is oxidized to a set length, to cause the second electrode to oxidize and deposit carbon on the first electrode.

9. The method of claim 8, further comprising the step of controlling voltage and current to the electric arc such that the rate of oxidation of one electrode is substantially the same as the rate of deposit of carbon on the opposite electrode.

10. The method of claim 8, wherein the step of supplying a quantity of a biomass liquid solution includes the step of mixing sugar with water.

11. The method of claim 8, wherein the step of supplying a quantity of a biomass liquid solution includes the step of mixing starch with water.

12. The method of claim 8, wherein the step of supplying a quantity of a biomass liquid solution includes the steps of breaking down cellulose to extract glucose, and mixing the glucose with water.

13. The method of claim 8, wherein said step of depositing carbon on the second electrode includes electroplating said electrode with carbon released from the biomass solution by oxidation.

* * * * *